United States Patent
Flack et al.

(10) Patent No.: US 11,070,392 B2
(45) Date of Patent: Jul. 20, 2021

(54) SYSTEM AND METHOD FOR PROVISIONING INTERNET ACCESS

(71) Applicant: Hilton International Holding LLC, McLean, VA (US)

(72) Inventors: John Flack, Memphis, TN (US); Jonathan Gaines, Memphis, TN (US)

(73) Assignee: Hilton International Holding LLC, McLean, VA (US)

( * ) Notice: Subject to any disclaimer, the term of this patent is extended or adjusted under 35 U.S.C. 154(b) by 352 days.

(21) Appl. No.: 16/173,626

(22) Filed: Oct. 29, 2018

(65) Prior Publication Data
US 2019/0132146 A1    May 2, 2019

Related U.S. Application Data

(60) Provisional application No. 62/578,167, filed on Oct. 27, 2017.

(51) Int. Cl.
*H04L 29/06* (2006.01)
*H04L 12/28* (2006.01)
(Continued)

(52) U.S. Cl.
CPC ...... *H04L 12/2876* (2013.01); *H04L 12/2872* (2013.01); *H04L 63/0876* (2013.01); *H04L 63/0884* (2013.01); *H04L 63/101* (2013.01); *H04W 12/06* (2013.01); *H04W 12/08* (2013.01); *H04W 76/11* (2018.02)

(58) Field of Classification Search
CPC . H04L 12/2876; H04L 12/08; H04L 12/2872; H04L 63/0884; H04L 63/101; H04L 63/0876; H04W 12/06; H04W 12/08; H04W 76/11
See application file for complete search history.

(56) References Cited

U.S. PATENT DOCUMENTS 6,636,894 B1    10/2003    Short et al.
6,970,459 B1    11/2005    Meier
(Continued)

FOREIGN PATENT DOCUMENTS

GB        2411329 A        8/2005

OTHER PUBLICATIONS

IEEE, 802.1Q, May 19, 2006, IEEE Computer Society, pp. 1-303.
Wikipedia, IEEE 802.1Q, pp. 1-5.

*Primary Examiner* — Nelson S. Giddins
(74) *Attorney, Agent, or Firm* — Standley Law Group LLP; Jeffrey S. Standley; Adam J. Smith

(57) ABSTRACT

A system and method for provisioning internet access to guests of a travel facility is provided. A number of access points are in electronic communication with a gateway device which is in electronic communication with a property management system (PMS) and a router. The PMS includes identifying information for guests registered with the travel facility. An API gateway and a central destination server are in electronic communication with the gateway device by way of the internet. The central destination server receives a request to connect to the internet from a personal electronic device and grants internet access if the personal electronic device is recognized as having previously been granted internet access for a duration of time and if the current time is within the duration of time.

15 Claims, 7 Drawing Sheets

(51) Int. Cl.
*H04W 76/11* (2018.01)
*H04W 12/06* (2021.01)
*H04W 12/08* (2021.01)

(56) References Cited

U.S. PATENT DOCUMENTS

| | | | |
|---|---|---|---|
| 6,996,073 B2 | 2/2006 | West et al. | |
| 7,152,109 B2 | 12/2006 | Suorsa et al. | |
| 7,433,673 B1 | 10/2008 | Everson et al. | |
| 7,720,031 B1 | 5/2010 | Cheng et al. | |
| 7,746,868 B2 | 6/2010 | Godlewski et al. | |
| 7,962,590 B1 | 6/2011 | Or et al. | |
| 8,245,276 B1 | 8/2012 | DeRosia et al. | |
| 8,893,226 B1 | 11/2014 | DeRosia et al. | |
| 9,009,310 B1 | 4/2015 | DeRosia et al. | |
| 9,367,867 B2 | 6/2016 | DeRosia et al. | |
| 9,684,939 B2 | 6/2017 | DeRosia et al. | |
| 2001/0037383 A1 | 11/2001 | Sabal | |
| 2001/0054101 A1 | 12/2001 | Wilson | |
| 2002/0022483 A1 | 2/2002 | Thompson et al. | |
| 2002/0112076 A1 | 8/2002 | Rueda et al. | |
| 2003/0016385 A1 | 1/2003 | Matsumoto et al. | |
| 2003/0028611 A1 | 2/2003 | Kenny et al. | |
| 2003/0067911 A1 | 4/2003 | Kikinis | |
| 2003/0105643 A1 | 6/2003 | Chen et al. | |
| 2003/0120763 A1 | 6/2003 | Volpano | |
| 2003/0140345 A1 | 7/2003 | Fisk et al. | |
| 2004/0034537 A1 | 2/2004 | Gengarella et al. | |
| 2004/0047320 A1 | 3/2004 | Eglin | |
| 2004/0083128 A1 | 4/2004 | Buckingham et al. | |
| 2004/0103282 A1 | 5/2004 | Meier et al. | |
| 2004/0111520 A1 | 6/2004 | Krantz et al. | |
| 2004/0214572 A1 | 10/2004 | Thompson et al. | |
| 2005/0154923 A1 | 7/2005 | Lok et al. | |
| 2005/0261970 A1 | 11/2005 | Vucina et al. | |
| 2006/0031436 A1 | 2/2006 | Sakata et al. | |
| 2006/0120282 A1 | 6/2006 | Carlson et al. | |
| 2006/0146863 A1 | 7/2006 | Spinar et al. | |
| 2006/0155598 A1 | 7/2006 | Spurr et al. | |
| 2006/0206933 A1 | 9/2006 | Molen et al. | |
| 2007/0038570 A1 | 2/2007 | Halbritter et al. | |
| 2007/0124490 A1 | 5/2007 | Kalavade et al. | |
| 2007/0143486 A1 | 6/2007 | Kang et al. | |
| 2007/0189168 A1 | 8/2007 | Yao | |
| 2008/0025321 A1 | 1/2008 | Gudipudi et al. | |
| 2008/0215381 A1 | 9/2008 | Reiter | |
| 2008/0287094 A1 | 11/2008 | Keeler et al. | |
| 2009/0067436 A1 | 3/2009 | Gast et al. | |
| 2009/0103448 A1 | 4/2009 | Waggener et al. | |
| 2009/0158442 A1 | 6/2009 | Zhang | |
| 2009/0287922 A1 | 11/2009 | Herwono et al. | |
| 2010/0202428 A1 | 8/2010 | Thompson et al. | |
| 2010/0296441 A1 | 11/2010 | Barkan | |
| 2010/0332615 A1 | 12/2010 | Short et al. | |
| 2013/0209108 A1 | 8/2013 | Krishnakumar et al. | |
| 2013/0297723 A1 | 11/2013 | Iwaniszyn | |
| 2013/0347073 A1* | 12/2013 | Bryksa | G06Q 10/02 726/4 |
| 2014/0068721 A1* | 3/2014 | Ong | H04W 12/0808 726/4 |
| 2015/0221005 A1 | 8/2015 | DeRosia et al. | |
| 2015/0254726 A1* | 9/2015 | Cassidy | H04W 4/50 705/14.58 |
| 2016/0219333 A1* | 7/2016 | Warrick | H04N 21/2665 |
| 2017/0287087 A1 | 10/2017 | Flack et al. | |

* cited by examiner

SYSTEM AND METHOD FOR PROVISIONING INTERNET ACCESS

CROSS-REFERENCE TO RELATED APPLICATION

This application claims the benefit of U.S. Provisional Patent Application Ser. No. 62/578,167 filed Oct. 27, 2017, which is hereby incorporated by reference as if fully restated herein.

TECHNICAL FIELD

Exemplary embodiments of the present invention relate generally to a system and method for provisioning internet access services to guests at travel facilities.

BACKGROUND AND SUMMARY OF THE INVENTION

Guests of many travel facilities such as hotels or other lodging facilities as well as transportation depots such as airports, train stations, and bus stations consider internet access to be more than an amenity. Many business travelers work while traveling and view internet access as an important factor in their ability to work while away from the office. They use the internet to complete work assignments as well as to communicate with their home offices. They may also use it to communicate with their family members back home. Leisure travelers also frequently use internet access services while traveling. They may use the internet to plan daily activities or to stay in contact with business colleagues as well as other family members not participating in the vacation. Many guests further use the internet for entertainment while traveling such as for accessing online games or downloading videos and music. For all guests, the availability of internet access service, and in particular high-speed internet access service, is an important consideration when selecting travel facilities. The availability of fast and reliable internet access service can influence their decision to select one travel facility over another.

In addition to expecting fast and reliable internet service, guests want an internet access service that is convenient and easy-to-use. Guests need to be able to connect quickly to the internet without the need to modify or reconfigure their personal electronic devices to establish the connection or without the need to create and maintain different user accounts that support access to the internet. Methods for accessing an internet connection, however, can vary depending upon the type of network or service used by a travel facility to initiate and support such connections. For example, in the overnight lodging industry, connection methods can vary not only across hotels' brands that are part of the same chain, but even across hotels of the same brand because of differences in the internet access service offered by each individual hotel. It is not uncommon for many travelers to stay in different hotels over successive nights. For example, a businessman may have a conference in San Diego on Monday and Tuesday and have to head straight to Seattle for a business deal to close on Wednesday and Thursday before heading home on Friday. Or, a family vacation may involve staying in Orlando for a couple days before heading to Myrtle beach. In these scenarios, it is desirable for a hotel chain to retain the guest when the guest moves from one location to another.

Efficient internet access services and connections are important to many, if not all, guests. Internet access is no longer seen as an amenity but as a requirement. internet service is commonly cited as the second most important quality of a hotel behind comfortable beds. As such, it is important for travel facility owners and operators to continually upgrade and improve their internet distribution system. Additionally, it is important for travel facility owners and operators to be able to effectively communicate with the user and control the user experience at a moment's notice.

Although travel facility guests today have specific expectations about the internet access services, meeting those expectations can be difficult. Different systems may be deployed within a travel facility or across travel facilities to provide specific features and functionality. The manner in which systems are interconnected and communicate with each other can have an effect on the internet access service for guests. As a result, there may be differences in the way services are provisioned and subsequently accessed by a guest. For example, within a hotel chain a guest may see different access service interfaces for the same brand of hotel. Account creation and authentication processes may differ and some hotels within the chain may offer a charge-to-room service while others do not. Finally, internet access services may differ between travel facilities with respect to location, payment options, and the like.

Problems that compromise the guest experience such as variability in interface, location, and payment options can be reduced by implementing a solution that allows for more standardization and control over the services provided by the travel facility. Providing seamless internet access services within a single travel facility as well as across travel facilities within a brand or a chain requires consistency in the features and functionality that are offered.

Therefore, there is a need for a system and method for provisioning internet access services across travel facilities. The present invention is a system and method for provisioning internet access services across travel facilities.

Stated more simply, the present invention is a system and method for provisioning internet access services to guests of a travel facility. The guest may access the internet by way of their personal electronic devices or by way of the travel facilities' electronic device. The entire user experience may be controlled from a single datacenter that is in connection with an application programming interface (API) gateway which presents a consistent user interface to the guest. A central destination server may be in connection with each individual facility's property management system (PMS) and gateway device. The use of this central destination server gives the owner or operators of multiple travel facilities the opportunity to effectively monitor data from all facilities and provide for a standard user experience across the enterprise. This central destination server may also utilize various API gateways to reduce congestion and process internet access requests much faster.

In an exemplary embodiment, the internet access service is offered to guests of one or more hotel chains. The systems and methods provide for a seamless guest-user experience in the transfer from one hotel to another within the same hotel brand. For example, a guest staying at a hotel in San Diego on Tuesday night and staying at the same hotel chain in Dallas on Wednesday night is able to connect a single time at the San Diego location and immediately have access upon arriving at the Dallas location without reverifying or logging back in. The ability to customize offerings in each facility allows a hotel chain to develop consistent service offerings in each facility regardless of the size or layout of the facility. Hotel companies that manage more than one brand of property can develop consistent service offerings within each brand. As a result, the guest experience in accessing the internet is more predictable and satisfying.

In another exemplary embodiment of the invention, each travel facility may be installed with various access points to initially capture the guest's internet access log-in request. At the initial log-in page displayed to a guest, the guest may have access to a limited number of specific websites the travel facility designates as acceptable without further authentication. This may include such web pages as the travel facilities home page. Should the guest wish to access the internet in a less-restricted capacity, the guest's credentials may be authenticated by the travel facility system after the guest attempts to log-in. This log-in request may contain such basic information as the guest's name, the room number, a property code for the specific travel facility the guest is requesting from, or a loyalty identification number. This information may be routed from the access point to a property management system located on-site which would then route the log-in request to a central destination server for all authentication or the access point may route the log-in request directly to the central destination server.

The central destination server may be in connection with one or more APIs. Certain embodiments of the invention may have a single API for each type of authentication required. For example, one API may authenticate whether the guest is staying at the specific travel facility. Another API may store the IP address of a device that a guest has previous attempted to log-in and has already been authenticated. That API may store the IP for a predetermined amount of time and allow the guest access to the internet just upon opening a web browser instead requiring guest log-in information again. Another API may be used should the guest wish to upgrade from a standard internet connections services to a premium internet connection service, which may include faster internet speeds, for a fee. That API may be able to accept the guest's credit card information or any other type of payment (Google® wallet, Apple® pay, Android® pay, or the like) or simply communicate to the property management system to add the charge to guest's current bill. In other exemplary embodiments, a single API gateway may control all of the aforementioned features. Alternatively, on in addition, the aforementioned data and information may be stored on one or more databases or servers, such as but not limited to the central destination server.

This system and method may permit the consolidation of guest data in a single location allowing for better metric analysis of all travel facilities. Furthermore, this system and system may permit the travel facility to provide a controlled and consistent end-user experience. This system and method may also permit the travel facility to control what types of content is displayed as a guest initially opens a web browser to enter log-in credentials. The travel facility can use this as a marketing opportunity to promote their services and amenities or their affiliates' and business partners' services and products. Furthermore, this information can be updated and may be changed at a moment's notice across every travel facility in the network for that chain. Running all connectivity through a single central destination server and/or single API gateway may permit the travel facility to make a uniform change among all travel facilities at the same time. This would allow the ability for a travel facility to push information to every guest's personal electronic device currently connected or change the information displayed to all devices that will connect in the future. This capability is also very useful to prevent cyber-attacks. Should the system ever detect any type of invasion or a need arises to shut down the system immediately, the central destination server will be able to terminate all internet connections for any guest at any time, protecting not only guest information stored in any travel facility's respective PMS but also preventing access of any invasive program to a currently connected personal electronic device.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
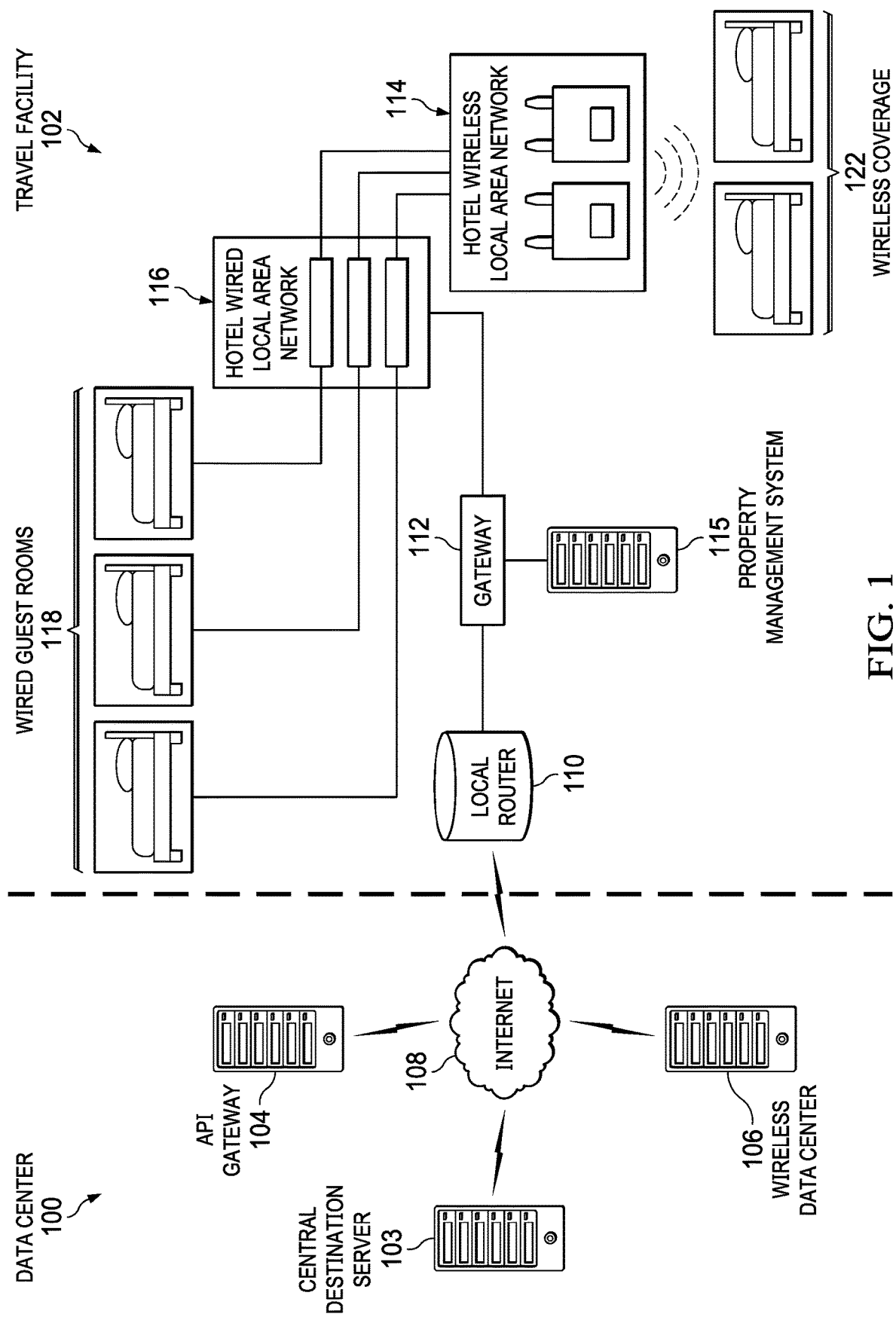
FIG. 1 is a simplified block diagram of an exemplary system in accordance with the present invention.

FIG. 1 illustrates a simplified block diagram of an exemplary system for providing internet access services at a number of travel facilities 102. The travel facilities 102 may be, for example without limitation, hotels, motels, inns, travel rest stations, hospitality forums, market venues, retailer, public, semi-public, or private structure where at least some members of the public can enter the structure and access the internet at the structure, some combination thereof, or the like. It is contemplated that each travel facility 102 may be of the same or a different type. Regardless, each travel facility 102 may be equipped with various devices and other equipment (e.g., data ports, cables, and the like) for providing wired and/or wireless internet access points to guests.

A number of travel facilities 102 may each comprise one or more wired local area networks (LAN) 116 and one or more wireless LANs 114. In other exemplary embodiments, some or all of the travel facilities 102 may exclusively have wired LANs 116 or wireless LANs 114. The wired LANs 116 may be electrically connected to a first number of guest rooms 118. Alternatively, or in addition, the wired LANs 116 may be electrically connected to one or more common areas. The wireless LANs 114 may provide wireless coverage for a second number of guest rooms 122. Alternatively, or in addition, the wireless LANs 114 may provide wireless coverage for one or more common areas. It is notable that some or all of the first number of guest rooms may be the same as some or all of the second number of guest rooms. Similarly, some or all of the one or more common areas part of the wired LAN 116 may be the same or different as those common areas part of the wireless LAN 114. The common areas may include, for example without limitation, the lobby, bar, restaurants, gyms, pools, and the like. Regardless, the wired and/or wireless LANs 114 and 116 may be installed at any number of locations throughout each respective travel facility 102.

The wired LANs 116 and the wireless LANs 114 may be in electronic communication with a gateway 112. The gateway 112 may control access to the internet 108 such as, but not limited to, the world wide web. More specifically, the gateway 112 may manage NATs (network address translation) IPs, provide DHCPs (dynamic host configuration protocol), and be configured to open and close ports so as to grant or deny guest access to a local router 110 connected to a network, such as but not limited to, the internet 108. Further, the gateway 112 may be configured to manage time allotments for internet access services. The gateway 112 may also be electrically connected to a property management system (PMS) 115 for the respective travel facility 102. The gateway 112 may also be in electronic communication with a local router 110.

Each travel facility 102 may comprise the aforementioned components. Each travel facility 102 may comprise a different number of such components. However, in exemplary embodiments, each travel facility 102 comprises one gateway 112 providing a common access point to the respective PMS 115, the respective local router 110, as well as the respective wired and/or wireless LANs 116 and 114.

Each of the travel facilities 102 may be connected to a single datacenter 100. The datacenter 100 may be located remote from the travel facilities 102 or may be located within one of the travel facilities 102. Regardless, the datacenter 100 may comprise a wireless data center 106 in electronic communication with the internet 108. The wireless data center 106 may be configured to receive and process payment information and provide verification regarding the same. The datacenter 100 may further comprise an API gateway 104 in electronic communication with the internet 108. The API gateway 104 may be configured to present a consistent user interface across all connected personal electronic devices herein. The API gateway 104 may be further configured to provide an initial log-in page on personal electronic devices attempting to connect to the internet 108. The API gateway 104 may be configured to receive the various information and selections from the operator of a personal electronic device shown or described herein as well as transmit such information and selections to any of the components shown or described herein, such as but not limited to a central destination server 103. The datacenter 100 may further comprise the central destination server 103 in electronic communication with the internet 108. The central destination server 103 may be electronic communication with the API gateway 104 and the wireless data center 106 by way of the internet 108. The central destination server 103 may be configured to control internet access services for each and every personal electronic device attempting to connect to one of the wired and/or wireless LANs 116 and 114 at each and every travel facility 102 as further described herein.

Each gateway device 112 may be in electronic communication with a respective property management system (PMS) 115. When a guest checks into a travel facility 102, identifying information for the guest may be entered into the respective PMS 115. Such identifying information may include, but is not limited to, the guest's first and last name, room number, length of stay, loyalty information, payment information, and the like. Alternatively, on in addition, the identifying information may be retrieved from other sources such as reservation systems. Once the guest is checked into the travel facility 102, additional identifying information such as the guest's room number and property code for the respective travel facility 102 may be added to the data stored at the PMS 115. The PMS 115 may be place in electronic communication with the gateway 112, the router 110, and the internet 108 by way of a private Wide Area Network (WAN) with a central destination server 103.

The API gateway 104 may be configured to push content to all connected electronic devices. The content to be pushed may be stored at the API gateway 104 and/or the central destination server 103, and the central destination server 103 may provide the commands to push the content to connected personal electronic devices. Such pushed contact may include, for example without limitation, advertising and marketing materials or emergency announcements. The API gateway 104 may be configured to permit periodic updates the presented user interface across all travel facilities 102. The use of a centralized API gateway 104 may also helpfully provide for a consistent experience across travel facilities 102 as well.

The central destination server 103 may be configured to selectively terminate internet connection with all connected personal electronic devices across all travel facilities 102. For example, without limitation, it may be desirable to terminate all internet connections upon detection of an attempted cyber-attack. The central destination server 103 may be similarly be configured to selective provide automatic internet access, or premium level services, to one or more personal electronic devices. For example, without limitation, it may be desirable to provide automatic internet access during an emergency or as compensation for ongoing issues.

Figure 2A:
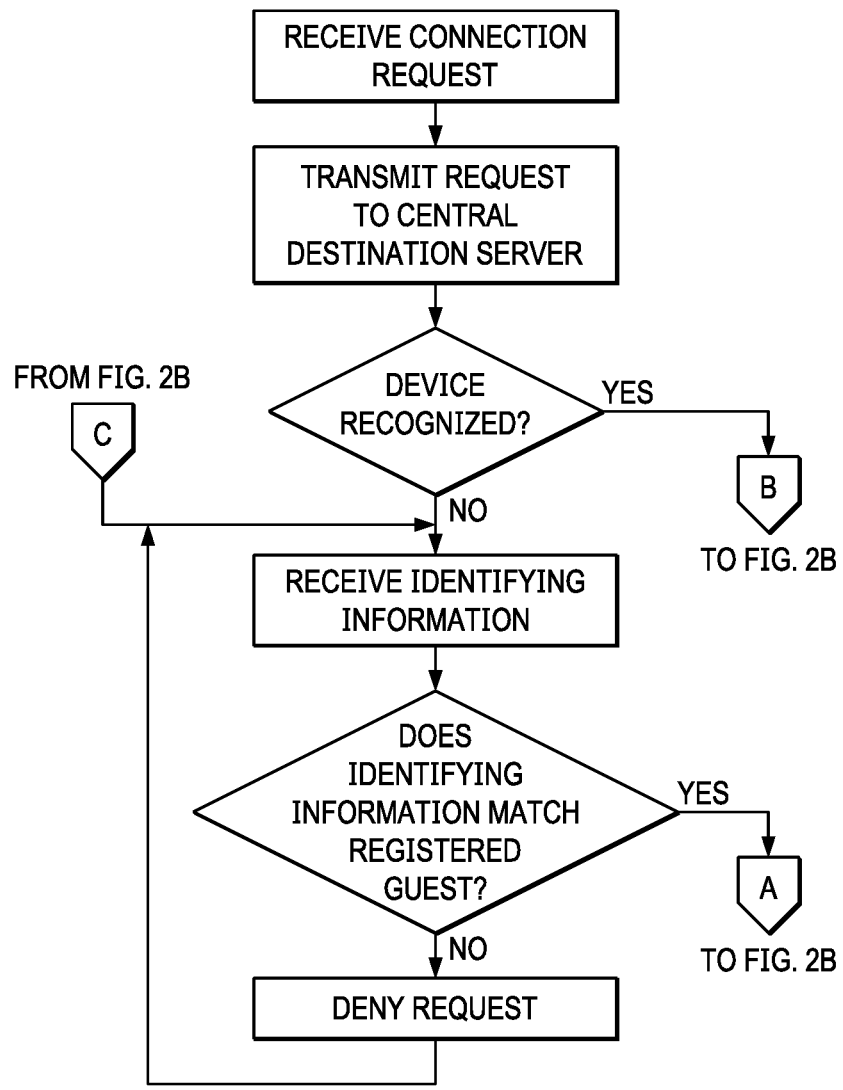
FIG. 2A is a flowchart with exemplary logic for operating the system of FIG. 1.
Figure 2B:
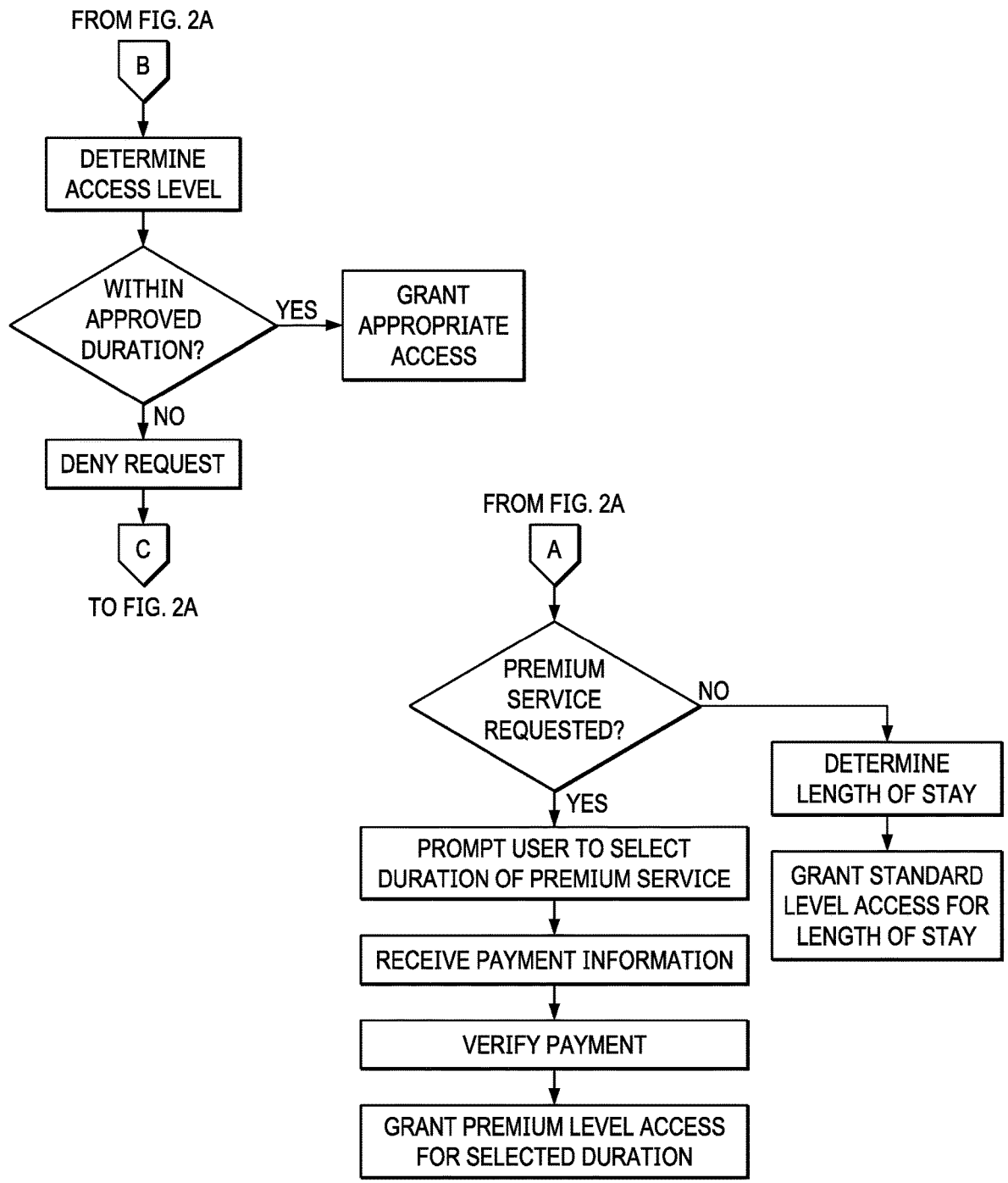
FIG. 2B is a continuation of the flowchart of FIG. 2A.

FIG. 2A and FIG. 2B are flowcharts with exemplary logic for operating the system of FIG. 1. A request to connect to the internet 108 may be received at the gateway 112 from one or more personal electronic devices connected to one or more of the wired and/or wireless LANs 116 and 114. The personal electronic devices may be smartphones, computers, tablets, music players, e-readers, or the like. The request may be transmitted to the central destination server 103. The transmitted request may comprise information sufficient to identify the travel facility 102 the request is associated with.

For example, without limitation, the request may identify the gateway device 112 from which the request is being transmitted such that the associated travel facility 102 may be identified. This information in the request may permit a subsequent request to retrieve a roster of guests staying at the travel facility 102 be routed to the appropriate PMS 115. In other exemplary embodiments, each PMS 115 may be subsequently queried until a match is found or it is determined that no matched can be found.

The central destination server 103 may determine if the personal electronic device is recognized. If the personal electronic device is recognized then the access level for the personal electronic device may be determined. If the access is still within the approved duration then connection approval for the appropriate access level may be granted. If access is outside of the approved duration then access may be denied. However, in exemplary embodiments, if access is initially denied then the guest may be prompted to enter identifying information which may be received at the central destination server 103 as further described herein. Such recognition may be performed, for example without limitation, by determining if the IP address of the requesting personal electronic device matches a stored IP address.

If, however, the personal electronic device is not recognized, identifying information for the guest may be received at the central destination server 103. Such information may be entered by the guest on his or her personal electronic device. The central destination server 103 may verify with the respective PMS 115 that the identifying information matches the identifying information of a guest staying at the respective travel facility 102. If no matching information is found the connection request may be denied. In exemplary embodiments, the user may be prompted to re-enter identifying information. In other exemplary embodiments, data from one or more additional PMS 115 may be retrieved and examined for the presences of a matching entry. The determination of whether the entered identifying information matches an existing guest's identifying information may be made at the central destination server 103. In other exemplary embodiments, the determination of whether the entered identifying information matches an existing guest's identifying information may be made at the PMS 115 for the respective travel facility 102.

If, however, matching information is found, a determination of weather premium service is requested may be made. If premium service is not requested, the guest's length of stay may be retrieved from the respective PMS 115. Access may be granted for standard level service for the duration of the stay and the IP address of the personal electronic device may be stored at the central destination server 103. It is contemplated that the duration of the stay may take into account future reservations at the same or different travel facilities 102 within the enterprise. For example, without limitation, the IP address of the personal electronic device of a guest staying two nights at a first travel facility 102 and three nights at a second travel facility 102 may be stored with a five-day duration of access. The use of a single central destination server 103 may permit the guest to automatically re-connect to the internet at the second travel facility 102 immediately upon arrival as the IP address of the guest's personal electronic device would be recognized upon attempting to connect at the second travel facility 102 and the current time would be within the duration.

If premium service is requested, the user may be prompted to select the duration of premium service requested. Payment information for the selected duration may be received at verified at the respective PMS 115 and/or at the wireless data center 106. For example, without limitation, if the guest elects to have the amount charged to the room, the same may be recorded and verified at the respective PMS 115 and the guest's invoice may be automatically updated to reflect the room charge. However, if the user elects to pay separately by credit card or other payment method, the same may be processed and verified by the wireless data center 106. Once payment is processed and verified, premium level service may be granted for the selected duration and the central destination server 103 may be updated to reflect the same. The duration may be any length of time. For example, without limitation, the gateway device 112 may be configured to permit a first guest with one hour of access, another guest with three days access, and another guest with a week of access. These timeframes are merely exemplary and are not intended to be limiting. It is contemplated that the gateway device 112 may provide any number of different access timeframes in any time increment for any number of guests. Regardless, the IP address of the personal electronic device may be stored at the central destination server 103 along with an indication of the premium service purchased. The indication of the premium service purchased may include the duration which the premium services are to be provided.

In exemplary embodiments, granting or denial of the connection request as described herein may be made via the respective gateway device 112, though such is not required. The command to grant or deny access may be relayed to the respective gateway device 112 by the central destination server 103.

It is notable that in exemplary embodiments the standard internet connection services may be included for registered guests. In other exemplary embodiments, the premium internet connection services may be included for registered guests who are members of a specified program, such as an organization, loyalty program, or the like. The central destination server 103 may be configured to determine if the guest attempting connection is a member of the specified program or otherwise entitled to premium internet services and grant appropriate access for the guest's personal electronic device.

Figure 3:
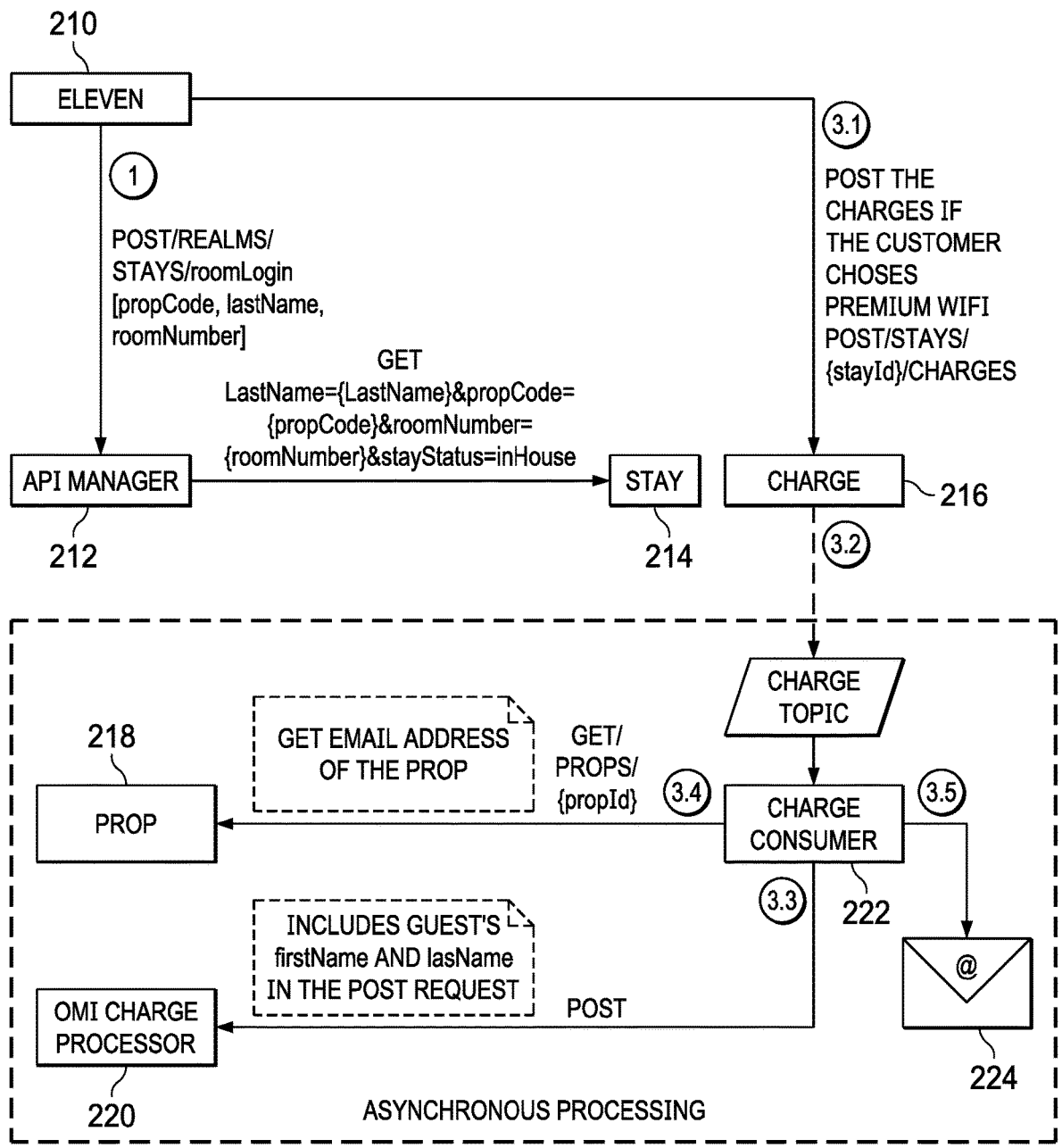
FIG. 3 is an exemplary flowchart and system diagram with other exemplary logic for operating the system of FIG. 1.

Referring to FIG. 3, a guest may initially choose whether to log in for standard internet or choose to pay for an upgraded or premium internet. The guest's options for internet access service may be presented on a common user interface by the API gateway 104. If the guest elects to connect to the standard internet provided by the travel facility 102, the guests request may be routed through an initial API manager 212 located either onsite or remotely from the travel facility 102. This initial API manager 212 may electronically communicate with other API gateways, such as but not limited to the API gateway 104, to receive the guest's identifying information, including but not limited to property codes identifying the travel facility 102 and whether the guest is currently staying at any travel facility 102. After the API manager 212 verifies the guest's status, the API manager 212 may permit the guest to access to the internet and afforded a stay condition 214. Under this stay condition 214, the guest need not run through the many levels of API authentication as needed for the initial connection to the internet 108. Instead, identification information for the personal electronic device the guest used to access the internet 108 may be stored. Such personal electronic device identification information may include the IP address of the personal electronic device.

The stay condition 214 information may be stored by a separate stay-API authentication. However, in other exemplary embodiments, this stay condition 214 information may be stored at the central destination server 103, the API manager 212 or at another location. Regardless, the personal electronic device identification information may be verified when the guest attempts to re-connect to the internet 108. For example, the guest may be prompted back to the log-in screen to begin the initial authentication process through the API manager 212 upon attempted re-connection, thus, allowing the guest to connect to the internet 108 faster and without having to enter login credentials again. The stay condition 214 may, in exemplary embodiments, be stored at the central destination server 103. The stay condition 214 may be configured to extend across multiple or all travel facilities 102. The stay condition 214 may take into account and provide access for the guest during their current stay as well as during scheduled future reservations at the same or multiple travel facilities 102.

The guest may also have the option to pay for access to a higher quality premium internet access services through the travel facility 102. Such premiums services may include the ability to utilize a greater bandwidth, faster speeds, and the like. If the guest selects a premium services option, the guest may be routed through a charging API 216. The charging API 216 may prompt the guest to enter payment information from a credit card, other payment source, or simply designate the charge to be added to the bill for the room the guest is staying in. The charging API 216 may run through the same or similar APIs as the standard internet service does to verify property and guest information. The charging API 216 may also be in electronic communication with an OMI charge processor 220 to verify credit card or other payment information. Once all payment and guest information has been verified through the respective APIs, the guest may be charged 222, the central destination server 103 may be notified that the guest 310 has been verified for the appropriate internet access service, and internet access may be granted 224. Such premium service may be selected for various durations and the amount charged may be changed appropriately. The stay condition 214 may be updated to reflect the selection of the premium service.

Figure 4:
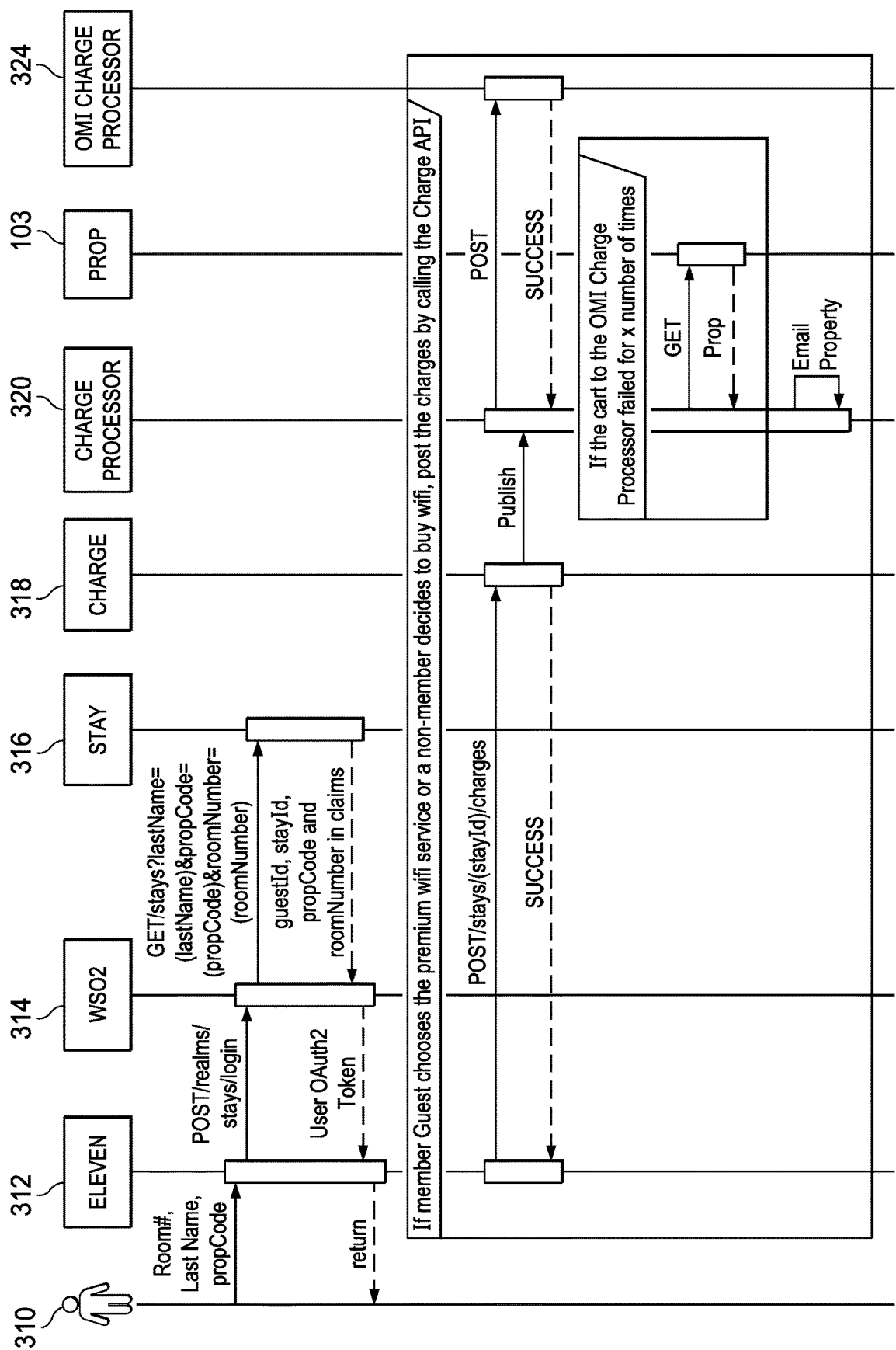
FIG. 4 is an exemplary flowchart and system diagram for guest authentication for use with the system of FIG. 1.

Referring to FIG. 4, a guest 310 may wish to connect to the travel facility's 102 provided internet 108. The guest 310 may do so by attempting a connection to the internet 108 on the guest's 310 personal electronic device. Upon attempting to connect, the guest 310 may be prompted to enter his or her name and room number. This information may be routed to an initial authentication API 312. The initial authentication API 312 may then electronically communicate to subsequent APIs 314 and/or the central destination server 103 to verify the guest's 310 entered identify information. Once the identify information is verified, the IP address for the guest's 310 personal electronic device may be stored by at a stay API 316 and/or at the central destination server 103 to conveniently connect that specific personal electronic device much quicker and without utilizing earlier API levels. Once the IP address is stored the identify information is verified, the initial authentication API 312 may grant the guest 310 access to the internet.

The guest 310 may also choose to pay for a premium service through the travel facility 102. When a guest 310 chooses this option, he or she may still be required to enter the same identify information required for the standard access but may also be required to enter payment information. This identify and payment information may be routed to the initial authentication API 312. This initial authentication may once again be in electronic communication with other APIs 314 and/or the central destination server 103 to verify all identity information and may also be in electronic communication with a charge API 318 specifically responsible for verifying payment information, such as but not limited to credit card information. This charge API 318 may verify credit card information with an OMI charge processor 324 and send back a successful signal to the charge processor 320. Once the charge processor 320 receives an authentication, the central destination server 103 may be notified that the charge went through. Instead of paying by credit card, a guest 310 may designate to have all internet charges billed to his room. If the guest 310 would like the payment added to the room bill, the charge processor 320 may verify with the central destination server 103 that the charge was posted to the bill. This process may be repeated multiple times until successful or may have a time-out feature in which the guest 310 may obtain access while the travel facility 102 is sent a notification saying the price could not be added and that it will manually need to be done at a later time.

The API gateway 104 and/or the central destination server 103 may be responsible for all travel facility 102 guests across all chains anywhere in the world or otherwise part of an enterprise. Alternatively, separate API gateways 104 and/or central destination servers 103 may be set up for the same purpose but to authenticate different guests. For example, the United States may have two regional API gateways 104 and/or the central destination servers 103 used to authenticate credit card information, one for the western half and one for the eastern half. One skilled in the art will recognize that each API gateway 104 and/or the central destination server 103 may be utilized for a single purpose or multiple purposes and may be used to route all information or just a portion of the information.

Figure 5A:
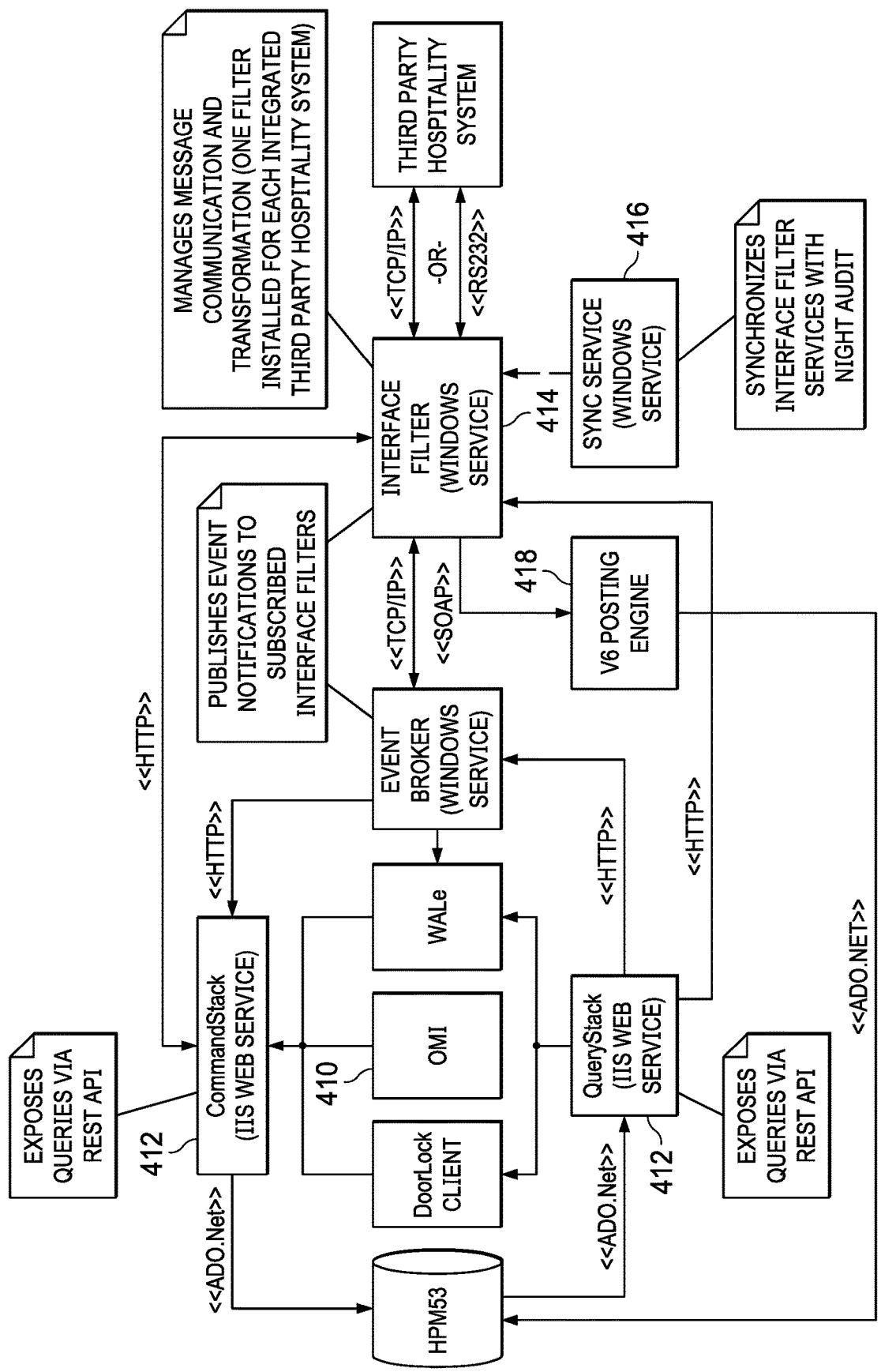
FIG. 5A is an exemplary interface framework component service-oriented architecture for use with the system of FIG. 1.
Figure 5B:
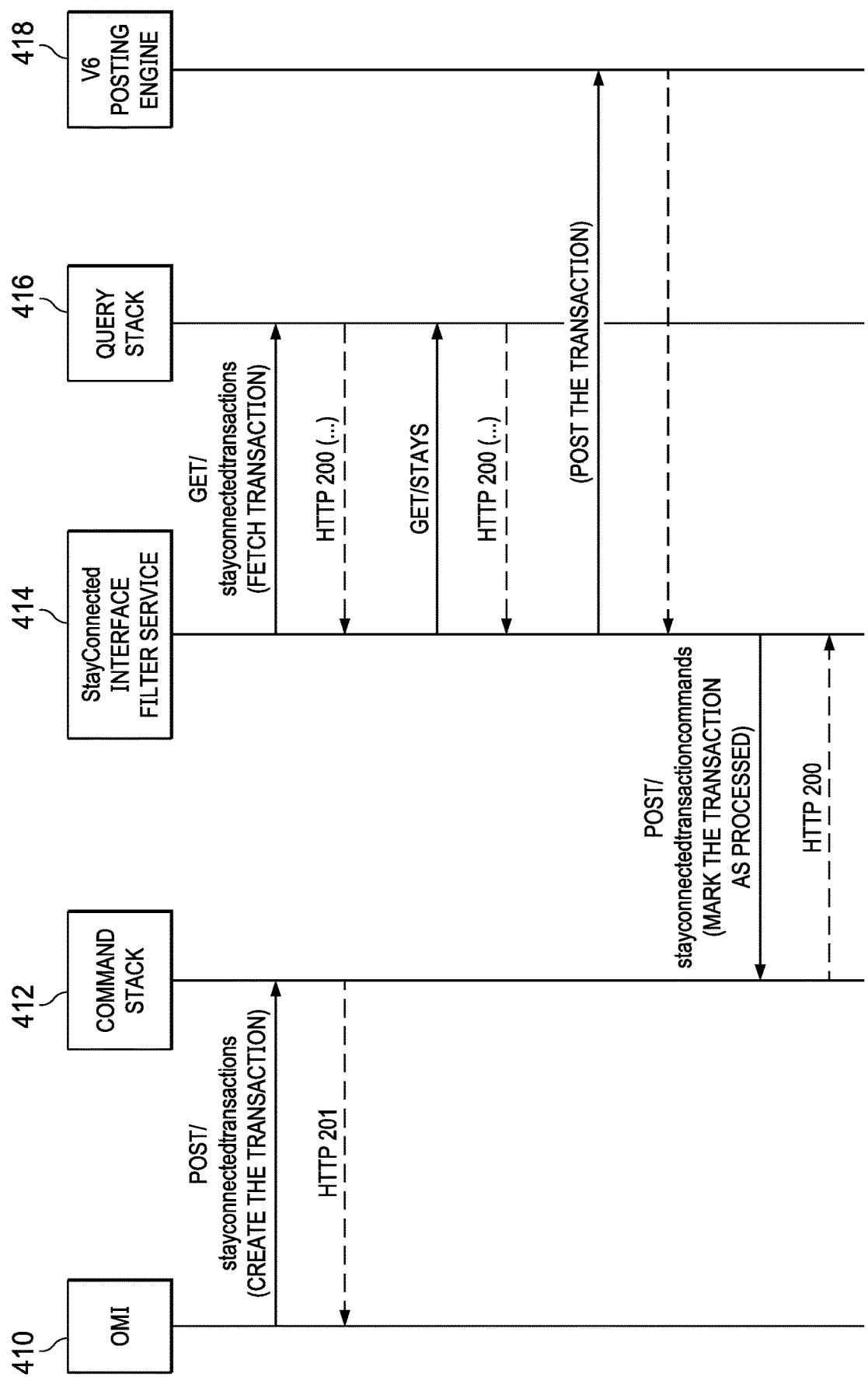
FIG. 5B is an exemplary flowchart and system diagram for asynchronous transaction posting processes for use with the system of FIG. 1.

Referring to FIG. 5A and FIG. 5B, an initial guest request may be routed through a first level API 410. The first level API 410 may send a message to a second level API 412 instructing it to create an unprocessed internet access transaction. An internet access filter 414 may send a message to the second level API 412 requesting all unprocessed transaction data. The internet access filter 414 may send a request to a third API level 416. This third API level 416 may verify the guest room and last name or other identity information in an attempt to locate a receipt to charge internet access to. If multiple receipts are located, the first receipt with a non-cash payment will receive the charge. If no receipt can be found, the transaction will post to an internal house account and the associated property may be notified of the inability to locate a receipt along with associated identity information for the guest. Once this verification has occurred and the proper receipt has been identified, this third level API 416 may send a signal to the posting engine 418 and the user may be granted internet access.

The present invention allows a company that manages a variety of travel facilities to provision internet access services efficiently and in a consistent manner across facilities. For companies that manage facilities under different brands, the system and method allow the company to define a consistent guest experience across each brand. The ability to provide a consistent guest experience under a particular brand helps the company to increase each guest's brand awareness and appreciation. The ability to meet an important need of business and leisure travelers helps the company to increase guests' brand loyalty. The connections described herein may be accomplished by wired or wireless connectivity of any type. All of the API's shown or described herein may be routed through the gateway API 104.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for provisioning internet access to guests of a travel facility, said system comprising:
   a number of access points, wherein a first portion of said number of access points are each associated with a first of a number of travel facilities, and a second portion of said number of access points are each associated with a second of a number of travel facilities;
   a number of gateway devices, each in electronic communication with one of the number of access points;
   a number of property management systems (PMS), each of which is associated with one of the number of travel facilities, and each of which is in electronic communication with each of the number of gateway devices for the associated one of the number of travel facilities, and each comprising identifying information for guests registered with the associated travel facility;
   one or more routers, each associated with one of the number of travel facilities, and each in electronic communication with each of the number of gateway device for the associated one of the number of travel facilities and an internet;
   an API gateway in electronic communication with each of the number of gateway devices of each of the number of travel facilities by way of the internet; and
   a central destination server in electronic communication with each of the number of gateway devices of each of the number of travel facilities and the API gateway by way of the internet;
   wherein the central destination server comprises software instructions which when executed configure the central destination server to:
      receive a request to connect to the internet from a personal electronic device by way of one of the number of access points associated with one of the number of travel facilities;
      determine if the personal electronic device is recognized as having been previously granted internet access for a duration of stay; and
      grant internet access to the personal electronic device if the personal electronic device is recognized and if a current time is within the duration of stay.

2. The system of claim 1 wherein:
   the central destination server comprises additional software instructions which when executed configure the central destination server to, if the personal electronic device is not recognized:
      receive identifying information for an operator of the personal electronic device
      retrieve said identifying information for guests from the number of PMS associated with the number of travel facilities;
      determine if the received identifying information for the operator matches any of the retrieved identifying information for the guests from any of the number of PMS; and
      grant internet access if the received identifying information for the operator matches any of the retrieved identifying information for the guests from any of the number of PMS.

3. The system of claim 2 wherein:
   said additional software instructions, when executed, further configure the central destination server to:
      determine, from the retrieved identifying information for quests, the duration of stay for the operator, wherein said duration of stay is determined as a continuous period of stay across multiple of the number of travel facilities as determined from retrieved identifying information from multiple of the PMS matching the received identifying information for the operator and associated with overlapping dates of stay; and
      store an IP address for the personal electronic device and the duration of stay at the central destination server.

4. The system of claim 3 wherein:
   the central destination server comprises additional software instructions which when executed configure the central destination server to deny internet access if the IP address of the personal electronic device is recognized and the current time is outside of the duration of stay.

5. The system of claim 4 further comprising:
   a wireless data center in electronic communication with the internet and configured to process payment information.

6. The system of claim 5 wherein:
   the central destination server comprises additional software instructions which when executed configure the central destination server to, if the personal electronic device is not recognized and the central destination server determines that the received identifying information for the operator matches an entry in the retrieved identifying information for guests:
      receive a selection of standard services or premium services from the personal electronic device;
      if a selection of standard services is made, grant access to standard services, and store the user selection of standard services in association with the IP address of the personal electron device and the duration of stay;
      if a selection of premium services is made:
         receive payment information from the personal electronic device;
         verify that said payment information has been successfully processed by the wireless data center;
         grant access to premium services, and store information sufficient to identify that premium services have been granted for the duration of stay in association with the IP address of the personal electronic device and the duration of stay.

7. The system of claim 6 wherein:
   the premium services comprise increased internet download speeds compared to the standard services.

8. The system of claim 6 wherein:
   the retrieved identifying information for guests includes an indication of whether each of the guests is a member of a membership program; and said additional software instructions, when executed, further configure the central destination server to automatically grant said premium services without pay if the matching retrieved identifying information for guests contains an indication that the operator is associated with a reservation associated with one of said guests enrolled in said membership program.

9. The system of claim 1 wherein:
each of the number of access points comprises:
at least one wired local area network; and
at least one wireless local area network.

10. The system of claim 1 wherein:
the request to connect to the internet comprise information sufficient to identify a particular one of the number of travel facilities from which the request emanates.

11. The system of claim 1 wherein:
the determination of whether the personal electronic device is recognized as having previously been granted internet access is determined by comparing the IP address of the personal electronic device with IP addresses stored at the central destination server.

12. A system for provisioning internet access to guests of multiple travel facilities, said system comprising:
a plurality of travel facilities, each respective one of the plurality of travel facilities comprising:
a number of access points, each configured to receive connection requests from personal electronic devices in wired or wireless connection with any of the number of access points;
a gateway device in electronic communication with each of the number of access points for the respective one of the plurality of travel facilities and configured to receive the connection requests;
a property management system (PMS) for the respective one of the plurality of travel facilities, wherein said PMS is in electronic communication with the gateway device and comprises identifying information for guests registered with the respective one of the plurality of travel facilities; and
a router in electronic communication with the gateway device for the respective one of the plurality of travel facilities and an internet;
an API gateway, remote from each of the plurality of travel facilities and in electronic communication with each of the gateway devices for each of the plurality of travel facilities by way of the internet and configured to provide a user interface for display at any of the personal electronic devices requesting access at any of the number of access points of any of the plurality of travel facilities; and
a central destination server in electronic communication with each of the gateway devices and the API gateway by way of the internet, comprising IP addresses for at least some of the personal electronic devices, and comprising software instructions which when executed configure the central destination server to:
receive a request to connect to the internet from a respective one of the personal electronic devices relayed by way of a respective one of the number of gateway devices, wherein said request to connect comprises an IP address of the respective one of the personal electronic devices attempting the connection;
determine if the IP address matches one of a number of IP address stored at the central destination sever and identified as having been previously granted internet access for a duration of stay;
if said IP address matches one of the number of IP addressed stored at the central database, retrieve the duration of stay associated with the matching IP address:
determine a current time; and
relay a command to the respective gateway device to grant internet access to the respective one of the personal electronic devices if the current time is within the duration of stay.

13. The system of claim 12 wherein:
the central destination server comprises additional software instructions which when executed configure the central destination server to, if the IP address does not match any of the number of IP addresses stored at the central database:
identify the respective one of the plurality of travel facilities from which the request is emanating;
prompt an operator of the respective one of the personal electronic devices, by way of the user interface generated by the gateway API, to enter identifying information;
retrieve said identifying information for said guests from each of the PMS for each of the number of travel facilities;
determine if the received identifying information matches any of the received identifying information, and if so:
determine the duration of stay for said operator, wherein said duration of stay is determined as a chronologically continuous period of stay across at least two of the plurality of travel facilities;
determine the current time;
relay a command to the respective gateway device to grant internet access if the current time is within the duration of stay.

14. The system of claim 13 wherein:
said additional software instructions, when executed, further configure the central destination server to:
store the IP address for the personal electronic device and the duration of stay at the central destination server.

15. A method for provisioning internet access to guests of multiple travel facilities, said method comprising the steps of:
providing, in each of a number of travel facilities, a number of access points configured to receive connection requests from personal electronic devices, a gateway device in electronic communication with each of the access points for each respective one of the number of travel facilities and configured to receive the connection requests for the respective one of the number of travel facilities, a property management system (PMS) in electronic communication with the gateway device for the respective one of the number of travel facilities and comprising identifying information for guests registered with the respective one of the number of travel facilities, and a router in connection with the gateway device for the respective one of the number of travel facilities and an internet;
providing an API gateway in electronic communication with all of the gateway devices of all of the number of travel facilities by way of the internet;
providing a central destination server in electronic communication with all of the gateway devices of all of the number of travel facilities and the API gateway by way of the internet and comprising executable software instructions;

periodically retrieving said identifying information from each of the PMS of each of the number of travel facilities;

populating said central destination server with IP addresses for the personal electronic devices, wherein each of said IP addresses is associated with a duration of stay, wherein each duration of stay is determined as a continuous length of stay across multiple of the number of travel facilities as determined from said identifying information periodically retrieved from each of the PMS of each of the number of travel facilities;

receiving a request to connect to the internet from a given one of the personal electronic devices at the gateway for the respective one of the number of travel facilities, wherein said request to connect comprises an IP address of the given one of the personal electronic devices attempting the connection;

relaying the request to the central destination server;

determining that the IP address matches one of the stored IP addresses;

retrieving, form the central destination server, the duration of stay associated with the matching IP address stored at the central destination server;

determining a current time;

determining that the current time is within the duration of stay; and relaying a command from the central destination server to the gateway device of the respective one of the number of travel facilities to grant internet access.

* * * * *